United States Patent
Corretjer et al.

(10) Patent No.: US 9,344,532 B2
(45) Date of Patent: May 17, 2016

(54) METHOD AND APPARATUS FOR OPERATING A RADIO COMMUNICATION DEVICE TO EFFICIENTLY PROPAGATE EMERGENCY SIGNALS

(71) Applicant: MOTOROLA SOLUTIONS, INC., Schaumburg, IL (US)

(72) Inventors: Jesus F. Corretjer, Weston, FL (US); Mohd Syazani Abdul Aziz, Plantation, FL (US); Cesar D. Aguilar, Weston, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 355 days.

(21) Appl. No.: 13/648,938

(22) Filed: Oct. 10, 2012

(65) Prior Publication Data
US 2014/0099910 A1 Apr. 10, 2014

(51) Int. Cl.
H04W 4/22 (2009.01)
H04L 29/06 (2006.01)
H04W 76/00 (2009.01)

(52) U.S. Cl.
CPC ............. *H04L 69/14* (2013.01); *H04W 76/007* (2013.01); *H04W 4/22* (2013.01)

(58) Field of Classification Search
CPC ..... G08B 25/016; G08B 27/001; H04W 4/22; H04W 76/007; H04W 84/047; H04W 8/20; H04W 28/22; H04W 88/04
See application file for complete search history.

(56) References Cited

U.S. PATENT DOCUMENTS

| | | | |
|---|---|---|---|
| 5,231,699 A | 7/1993 | Tendler | |
| 7,324,636 B2 | 1/2008 | Sauvage et al. | |
| 7,580,706 B2 | 8/2009 | Koren et al. | |
| 8,077,028 B2 | 12/2011 | Lane et al. | |
| 2004/0190483 A1* | 9/2004 | Shahaf | H04W 84/08 370/347 |
| 2004/0203567 A1 | 10/2004 | Berger | |
| 2007/0142072 A1 | 6/2007 | Lassally | |
| 2008/0172232 A1 | 7/2008 | Gurley | |
| 2010/0137015 A1* | 6/2010 | Blanco | 455/518 |
| 2011/0034145 A1* | 2/2011 | Youn et al. | 455/404.1 |
| 2011/0124312 A1* | 5/2011 | Kwon et al. | 455/404.2 |

(Continued)

FOREIGN PATENT DOCUMENTS

WO 2007912219 A1 8/2007

OTHER PUBLICATIONS

Ishibashi et al "A proposal of forwarding method for urgent messages on an ubiquitous wireless sensor network" Information and Telecommunication Technologies, 2005; XP010893476.*

(Continued)

*Primary Examiner* — Liton Miah
(74) *Attorney, Agent, or Firm* — Daniel R. Bestor

(57) ABSTRACT

A method and apparatus are provided by which a radio communication device relays emergency signals across different channels using dual-watch. A dual-watch primary receiver of the radio communication device is allocated to a user selected home channel, while a dual-watch secondary receiver continually scans a pre-stored list of secondary channels for the purpose of detecting a possible emergency signal. The radio communication device upon detecting an emergency signal in either the home channel or any of the scanned secondary channels, relays the emergency signal to all the channels present in the radio communication device's channel list, except for the originating channel.

20 Claims, 7 Drawing Sheets

(56) References Cited

U.S. PATENT DOCUMENTS

2011/0212700 A1* 9/2011 Petite .................... 455/404.1
2012/0184237 A1* 7/2012 Gaines et al. ............ 455/404.1

OTHER PUBLICATIONS

Henry S. Kenyon, Word-Spotting System Catches Wireless Data—SIGNAL Magazine—Sep. 2007—2 pages—Copyright 2012 AFCEA International.
Cobra Electronic Corp.—Weatherband CD Radio—Extracted Jul. 17, 2012.
Digital Selective Calling—Extracted from Wikipedia—Jul. 17, 2012—3 pages.
NSFSI—Emergency Notification Systems/Platforms—Cloud Reminder—Extracted from www.nsfsi.org—Jul. 18, 2012—2 pages.
PCT International Search Report Dated Feb. 24, 2014 for Counterpart Application PCT/US2013/063789.
Ishibashi K., et al. "A Proposal of Forwarding Method for Urgent Messages on an Ubiquitous Wireless Sensor Network", Information and Telecommunication Technologies, APSITT Proceedings, 6th Asia-Pacific Symposium on Yangon, Myanmar, Nov. 9-10, 2005, pp. 293-298; XP010893476, ISBN:978-4-88552-216-1;Abstract Sections I.-II.
Kawai, T., et al. "Proposal of an Assured Corridor Mechanism for Urgent Information Transmission in Wireless Sensor Networks", IEICE Transactions on Communications, Communications Society, Tokyo,JP; vol. E90B, No. 10, Oct. 1, 2007, pp. 2817-2826, XP001508610; ISSN:0916-8516, D0I; 10.1093/IETCOM/E90-B. 10.2817, Abstract, Sections 1.-3.

* cited by examiner

METHOD AND APPARATUS FOR OPERATING A RADIO COMMUNICATION DEVICE TO EFFICIENTLY PROPAGATE EMERGENCY SIGNALS

FIELD OF THE DISCLOSURE

The present disclosure relates generally to radio communication devices for efficiently propagating emergency signals, and more particularly to radio communication devices for efficiently propagating emergency signals across different channels using dual watch.

BACKGROUND

Emergency signals are used in two-way radio systems to provide an alert to a critical situation. In current two-way radio operation, whenever a radio communication device generates an emergency signal, the emergency signal can only be heard by other radio communication devices that are currently tuned to the same originating channel. In current two-way radio operation, there is no mechanism to propagate emergency signals across multiple channels while operating in talk-around mode, also referred to as direct (radio-to-radio) mode, which lacks the presence of a base repeater. Some systems use a base station or a centralized dispatch console with the ability to perform frequency "patching" that allows the emergency signal to be heard across different channels, but this is no longer considered radio-to-radio mode. Even in these base repeater scenarios, there is no mechanism to propagate emergency alerts amongst a group of radio communication devices using different channels, when the radio communication devices go "out-of-range" from the system.

Thus, there is a need to have a mechanism for radio communication devices operating in talk-around mode to efficiently propagate emergency signals across different channels.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
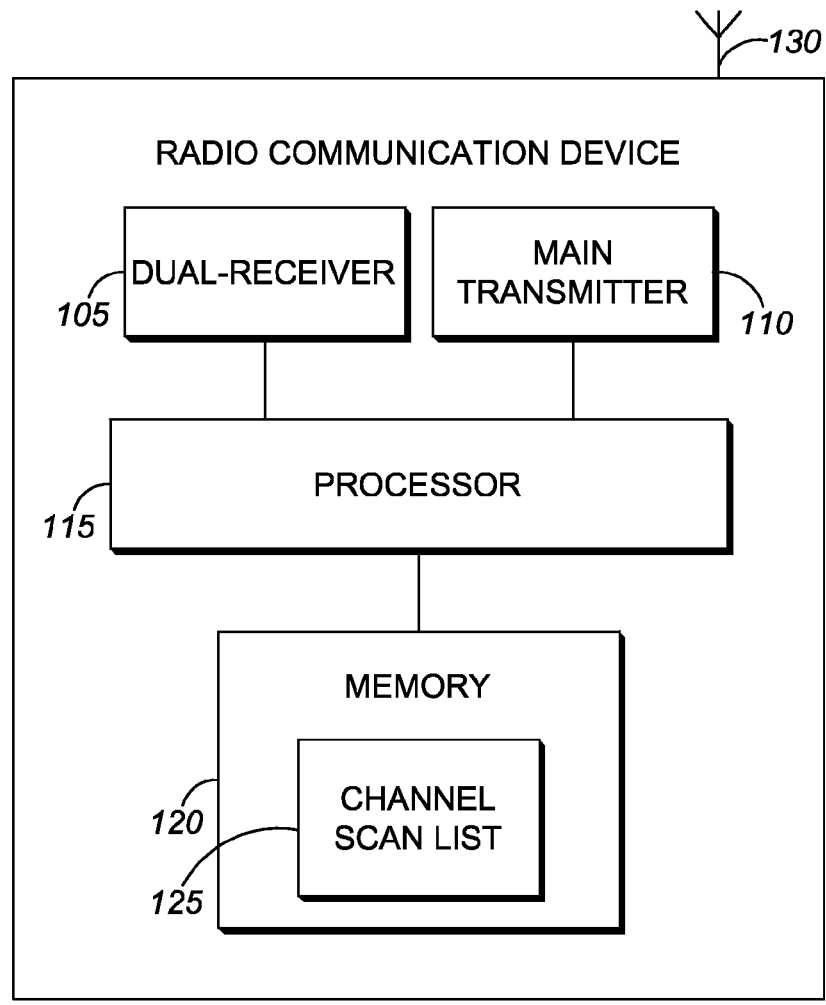
FIG. 1 is a block diagram of a radio communication device in accordance with the various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method and apparatus by which a radio communication device relays emergency signals across different channels using dual watch. A dual-watch primary receiver of the radio communication device is allocated to a user selected home channel, while a dual-watch secondary receiver continually scans a pre-stored list of secondary channels for the purpose of detecting a possible emergency signal. The radio communication device, upon detecting an emergency signal in either the home channel or any of the scanned secondary channels, relays the emergency signal to all the channels present in the radio communication device's channel list, except for the originating channel.

FIG. 1 is a block diagram of a radio communication device 100 operating in accordance with various embodiments. In one embodiment, the radio communication device 100 operates in a talk-around mode where the radio communication devices communicate directly with each other without any infrastructure devices such as a base repeater. The radio communication device 100 comprises a dual-watch receiver 105, a main transmitter 110, a processor 115, a memory 120 for storing a channel scan list 125, and an antenna 130. In accordance with various embodiments, the dual-watch receiver 105 comprises a dual-watch primary receiver tuned to a primary channel. In accordance with various embodiments, the primary channel is a home channel selected by the user to perform basic communication functionality. The dual-watch receiver 105 further comprises a dual watch secondary receiver that continually scans various channels in the radio communication device's channel scan list 125 for the purpose of detecting a possible emergency signal. In accordance with various embodiments, the various channels included in channel scan list 125 other than the primary channel of the radio communication device 100 are also known as secondary channels. In the dual-watch capable radio communication device 100, scanning of the radio communication device's channel list can occur in parallel to, and without interrupting, basic radio functionality in the selected home channel.

The main transmitter 110 of the radio communication device 100 can be tuned to communicate over various channels on which the radio communication device is programmed to talk to one or more peers, for example, other radio communication devices, in the radio-to-radio mode. In accordance with the various embodiments, when an emergency signal is detected by the dual-watch receiver 105 of the radio communication device 100 on either the home channel or any of the secondary channels, the processor 115 instructs the main transmitter to relay the emergency signal on all the channels in the radio communication device's channel scan list 125, except for the channel on which the emergency was originated. The main transmitter 110 and the dual watch primary receiver together form a wireless transceiver to enable bi-directional wireless communication with other devices using antenna 130.

The processor 115 of the radio communication device 100 decodes the emergency signal detected by the dual-watch receiver 105 on either the primary channel or the secondary channels. The processor 115 includes one or more microprocessors, microcontrollers, DSPs (digital signal processors), state machines, logic circuitry, or any other device or devices that process information based on operational or programming instructions. The processor 115 is further configured to issue an emergency call alert to the radio communication device's user (including both display and audible radio alerts) along with the originating radio communication device's identification and location information. In accordance with the various embodiments, the processor 115 is configured to detect an emergency situation from voice signals received on either the primary channel or the secondary channel using one or several voice recognition techniques. The radio communication device 100 further includes a memory 120 for storing the list of primary and secondary channels of the channel scan list 125, thereby providing the radio communication device with user selectable channels for communication with one or more peers.

Figure 2:
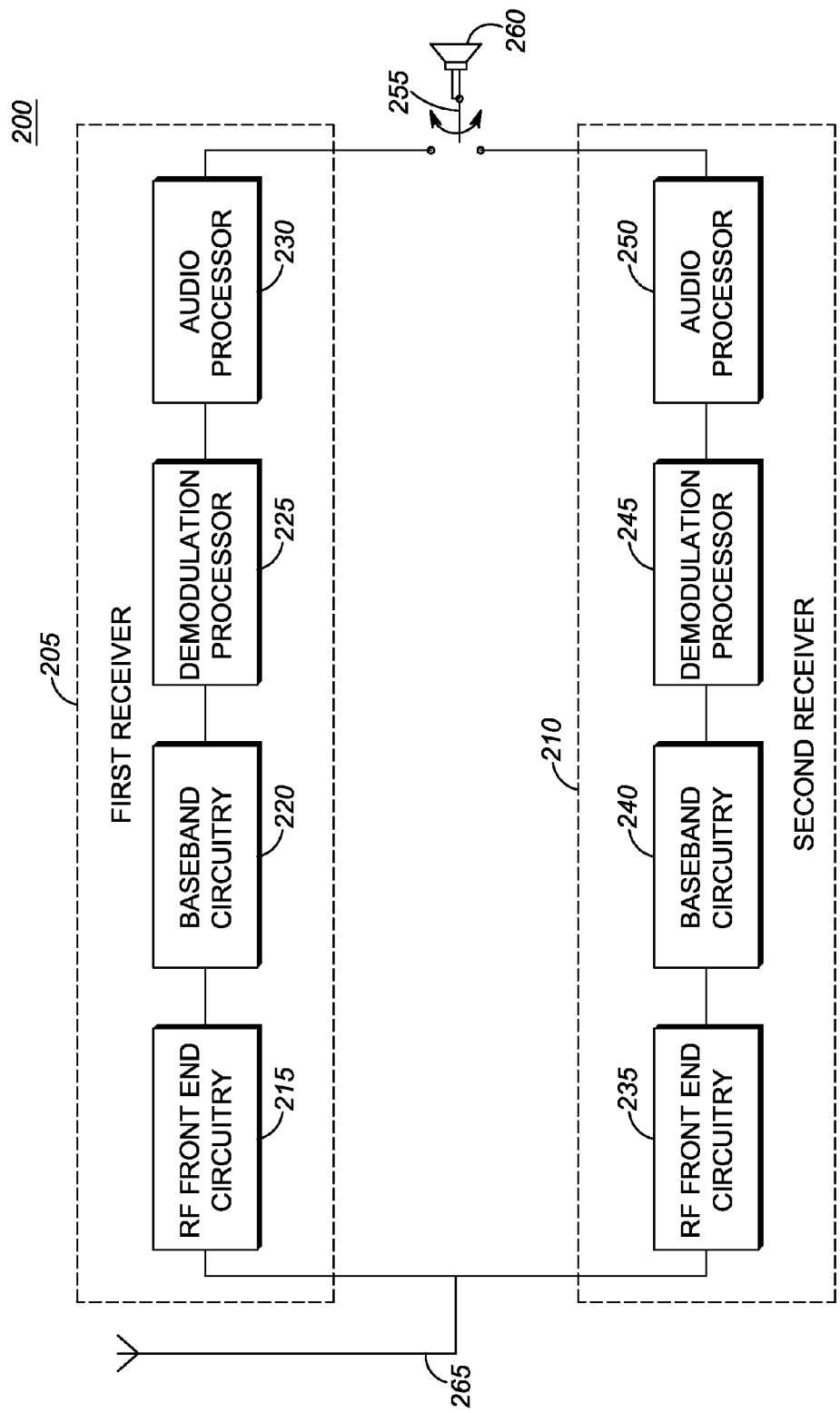
FIG. 2 is a detailed block diagram of a dual watch receiver of the radio communication device in accordance with the various embodiments of the present disclosure.

FIG. 2 is a detailed block diagram of a dual-watch receiver 200 such as used and operating in radio communication device 100 in accordance with the various embodiments. The block diagram shows two receivers namely a first receiver 205 and a second receiver 210. The first receiver 205 of the radio communication device 100 receives the communication over a primary channel selected by the user, and the second receiver 210 of the radio communication device 100 scans a list of secondary channels for the presence of an emergency signal. In accordance with various embodiments, the first receiver 205 of the radio communication device 100 is also known as dual-watch primary receiver. The first receiver 205 of the radio communication device 100 receives signals on the primary channels using antenna 265 and radio frequency (RF) front end circuitry 215 processes the received signals at the incoming radio frequency. Baseband circuitry 220 then converts the processed received signal to a lower intermediate frequency known as baseband frequency and passes the intermediate frequency signal for demodulation processing to a demodulation processor 225. The demodulation processor 225 then extracts the original information bearing signal from the received signal. The extracted original information bearing signal is then passed to an audio processor 230 for processing the audio in the extracted original information bearing signal. The processed audio signal is then provided to a switch 255 and depending upon the state of the switch 255, the processed audio signal is provided to a speaker 260 as an output.

Similarly, the second receiver 210 comprises RF front end circuitry 235, baseband circuitry 240, a demodulation processor 245, and an audio processor 250 for processing the signal received on the plurality of scanned secondary channels. Depending on the state of the switch 255, the processed signal is provided as an output to the speaker 260.

Figure 3:
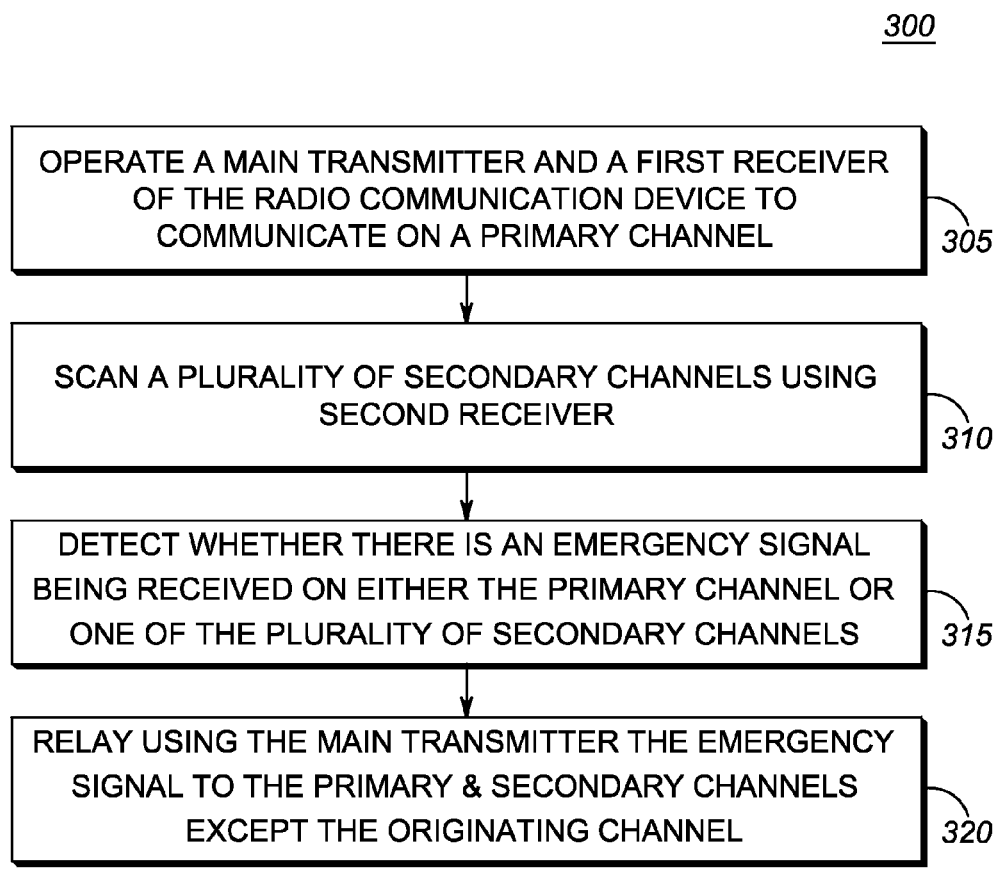
FIG. 3 is a flowchart illustrating a method for relaying emergency signals across different channels in accordance with the various embodiments of the present disclosure.

FIG. 3 is a flowchart 300 illustrating a method for relaying emergency signals across different channels in accordance with the various embodiments. At 305, the radio communication device 100 is turned on and its main transmitter 110 and the first receiver 205 are tuned to communicate over a selected home channel also known as a primary channel. The first receiver 205 of the radio communication device 100 also checks for all activities (such as data calls) on the primary channel to determine if there is any emergency signal being received in the data call. Further, at 310, the second receiver 210 of the radio communication device 100 scans a plurality of the secondary channels stored in the memory 120 of the radio communication device 100. In one embodiment, the radio communication device 100 uses the channel scan list 125 to determine the secondary channels that need to be scanned. In accordance with various embodiments, the secondary channels are the channels that the user of the radio communication device 100 may select to talk to one or more peers in talk-around (radio-to-radio) mode.

At 315, the radio communication device 100 detects whether there is any emergency signal being received on either the primary channel or the secondary channels. In accordance with various embodiments, the radio communication device 100 first checks for any activity (such as data calls) on the primary channel and the plurality of secondary channels, and if any activity is detected, the radio communication device 100 attempts to decode the activity to check for any emergency signal. Further, if the radio communication device 100 fails to decode the activity, the radio communication device 100 then attempts to detect an emergency situation from the received voice call by using various voice recognition techniques. In accordance with various embodiments, the radio communication device 100 monitors for a voice call on both the primary channel and the plurality of secondary channels and detects the emergency signal based on either one or more emergency related pre-selected keywords or phrases in an active channel's audio stream (e.g. MAYDAY, EMERGENCY, etc.), or on detection of voice distress in the active voice call.

The radio communication device 100 upon detecting the emergency signal on either the primary or one of the secondary channels, relays the emergency signal to non-detected primary and non-detected secondary channels. As used herein, the term "non-detected primary and secondary channels" refers to those primary and secondary channels in which the emergency signal is not detected when the radio communication device is operating and/or scanning the channels. In other words, the non-detected primary and secondary channels exclude those channels on which an emergency signal is detected.

Figure 4A:
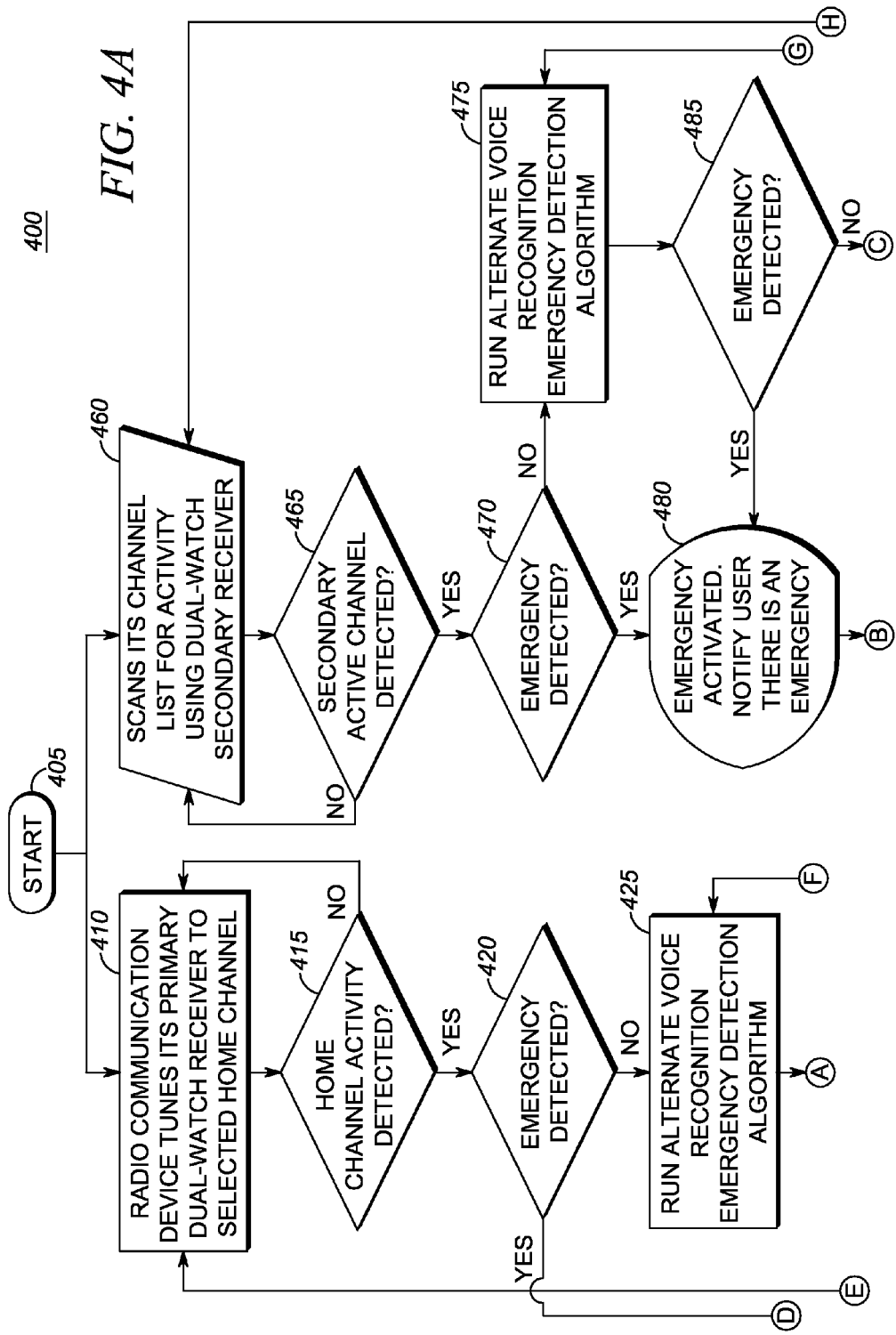
FIGS. 4A and 4B show a detailed flowchart illustrating a method for relaying emergency signals across different channels in accordance with the various embodiments of the present disclosure.
Figure 4B:
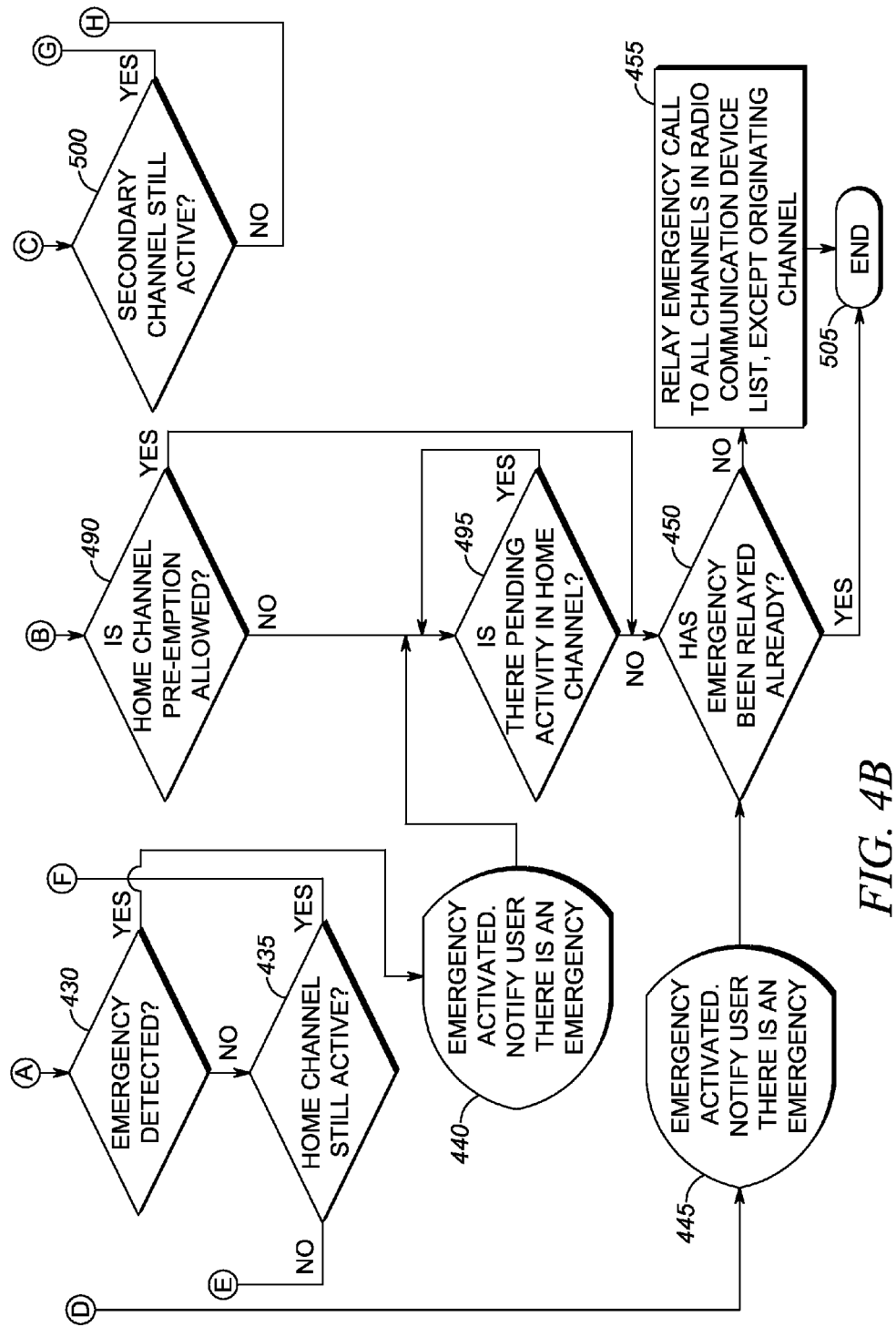

FIG. 4 is a flowchart 400 illustrating a detailed method for relaying emergency signals across different channels in accordance with the various embodiments. At 405, the radio communication device 100 is turned on and its dual-watch primary receiver 205 is tuned to a selected primary channel at 410. In accordance with various embodiments, the selected primary channel is a home channel selected by the user of the radio communication device 100 to communicate with other peers. The dual-watch primary receiver 205 then checks for any activity (such as data call) on the home channel at 415. When there is no activity detected on the home channel, the radio communication device 100 remains tuned to the selected home channel.

When activity is detected on the home channel at 415, the radio communication device 100 decodes the detected activity to determine if the detected activity contains any emergency signal or not at 420. If the radio communication device 100 is unable to decode the detected activity for the emergency signal then the radio communication device 100 runs an alternate voice recognition emergency detection algorithm at 425. The radio communication device 100 then attempts to detect an emergency situation from the received voice signal (provided a voice call is going on) at 430. In accordance with various embodiments, an emergency situation can be inferred from the received voice stream by using one or several voice recognition techniques in the voice call. In an exemplary embodiment, the emergency situation can be detected based upon the detection of one or more emergency related preselected keywords or phrases in the primary channel's audio stream (e.g. MAYDAY, EMERGENCY, etc.), or on the detection of voice distress in the primary channel's audio stream. Upon detection of an emergency situation via voice recognition, the radio communication device 100 also initiates a regular emergency alert to the user with the originating radio communication device's information (unit ID and the location) at 440. If the radio communication device 100 is not able to detect an emergency situation via voice recognition, the radio communication device 100 then goes back to a "steady state" in which the radio communication device 100 stays tuned to the home channel at 435 once activity in either the home channel or secondary channel ends.

Returning to 420, if the radio communication device is able to successfully decode the activity, then the radio communication device 100 notifies the user that there is an emergency at 445. In accordance with one embodiment, the radio communication device 100 immediately issues a regular emergency alert to the user (involving both display and audible radio alerts), containing the ID and the location information of the radio communication device from which the emergency signal was initially originated at 445. After notifying the user, the process proceeds to 450.

Similarly, at 460, the radio communication device 100 scans its channel list for activity using its dual watch secondary receiver. At 465, the radio communication device 100 checks for activity (such as a data call) in all secondary channels at 465. In one embodiment, the radio communication device 100 sequentially scans the secondary channels listed in the channel scan list 125 to determine emergency signal. When there is no activity detected on any of the secondary channels, the radio communication device 100 keeps continually scanning the radio communication device's channel list at 460. When an activity is detected on any of the secondary channels, the radio communication device 100 decodes the activity to check whether the detected activity contains any emergency signal at 470. If that is the case, the radio communication device 100 activates the emergency and notifies the user of the emergency at 480. If the radio communication device 100 is unable to decode the detected activity on the secondary channels, then the radio communication device 100 runs various alternate voice recognition emergency detection algorithms to detect the emergency at 475 in a voice call. As discussed above, the emergency situation can be detected based upon the detection of one or various emergency related pre-selected key words or phrases in the secondary channel's voice call (e.g. MAYDAY, EMERGENCY, etc.), or on the detection of voice distress in the secondary channel's voice call. The radio communication device 100 then checks for any emergency at 485. In the event of detecting an "emergency signal" in a scanned secondary channel by any of the methods mentioned above, the radio communication device 100 activates the emergency and notifies the user of the emergency at 480.

In accordance with various embodiments, the radio communication device 100 may further check if pre-emption of the home channel is allowed at 490. If pre-emption of the home channel is not allowed, the radio communication device 100 checks if there is any pending activity on the home channel. If there is any pending activity on the home channel, the radio communication device 100 then waits until the completion of the activity. If the pre-emption of the home channel is allowed, the radio communication device 100 pre-empts any signal reception on the home channel for relaying the emergency signal and proceeds to 450. In case the pre-emption of the home channel is allowed, the radio communication device 100 directly proceeds to 450. At 450, the radio communication device 100 determines whether the detected emergency has already been relayed to other radio communication devices or not. In case the emergency signal has not been already relayed, then the radio communication device 100 relays the emergency call on all the channels in the radio communication device's list, except on the originating channel at 455. In accordance with various embodiments, the originating channel is the channel on which the emergency signal was initially originated. Further, in order to avoid the pathological condition of different radio communication devices running the proposed algorithm continually looping the relayed emergency signal amongst each other, a distinctive "relay" version of an emergency signal is used to relay to other radio communication devices, such that the emergency signal is not repeated (or relayed) forward when received. Further, when it is determined that the emergency signal has already been relayed, the radio communication device 100 refrains the main transmitter 110 from relaying the emergency signal and the process thus ends at 505.

In accordance with various embodiments, if an emergency signal is detected on the primary channel, the radio communication device 100 relays the emergency signal to all the secondary channels. However, if the emergency signal is detected on any of the secondary channel, then the radio communication device 100 relays the emergency signal to the primary channel and the secondary channels other than the secondary channel on which the emergency signal was received. In the event of detecting an "emergency signal" in the primary home channel by voice recognition analysis of the received voice stream, the radio communication device 100 waits for the dual watch primary receiver call to finish (as it is considered mission critical) and then relays the emergency to peer users as mentioned earlier.

Figure 5A:
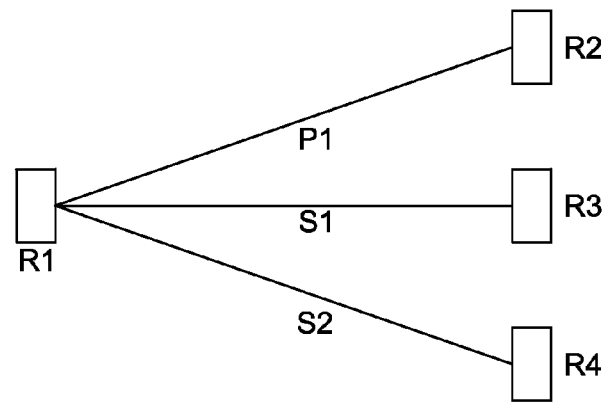
FIGS. 5A, 5B, and 5C show a flow diagram for relaying emergency signals across different channels in accordance with the various embodiments of the present disclosure.
Figure 5B:
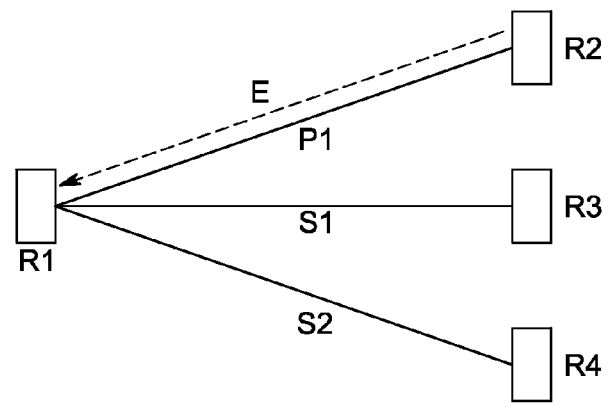
Figure 5C:
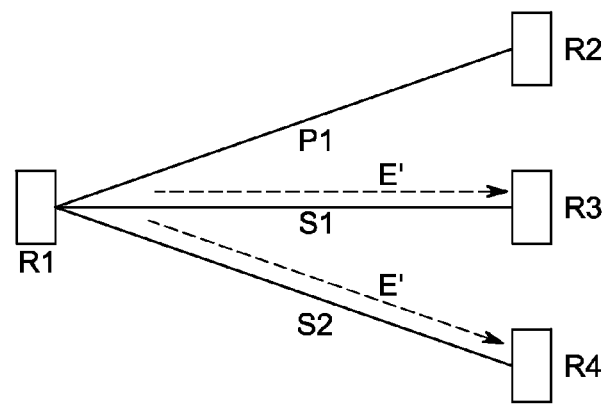

FIGS. 5A, 5B, and 5C show a flow diagram for relaying emergency signals across different channels in accordance with various embodiments. FIG. 5A shows a radio communication device R1 in communication with radio communication device R2 over a primary channel P1 using R1's primary receiver and main transmitter. In accordance with various embodiments, the primary channel is a home channel selected by the user. Further, the radio communication device R1 scans a list of secondary channels S1 and S2 stored in the channel scan list 125 of the radio communication device R1 using its second receiver.

In accordance with various embodiments, the radio communication device R1 checks for any emergency signal E on the primary channel P1 and the various secondary channels S1 and S2. In this example, the radio communication device R1 receives an emergency signal E on the primary channel P1 as shown in FIG. 5B. Further, as shown in FIG. 5C, the radio communication device R1 upon detecting the emergency signal E on the primary channel P1, relays the emergency signal, referred as E', on non-detected channels. As used herein, the term "non-detected primary and secondary channels" refers to those primary and secondary channels in which the emergency signal is not detected when the radio communication device is operating and/or scanning the channels. In other words, the non-detected primary and secondary channels exclude those channels on which an emergency signal is detected. In this example, the radio communication device R1 relays the relayed emergency signal E' on the secondary channels S1 and S2 using its main transmitter. In accordance with various embodiments, the relayed emergency signal E' is a relayed version of the received emergency signal E. By relaying the emergency signal E' on the secondary channels S1 and S2, the radio communication device R1 relays the emergency signal E' to other radio communication devices R3 and R4 operating on the secondary channels S1 and S2 respectively.

Figure 6A:
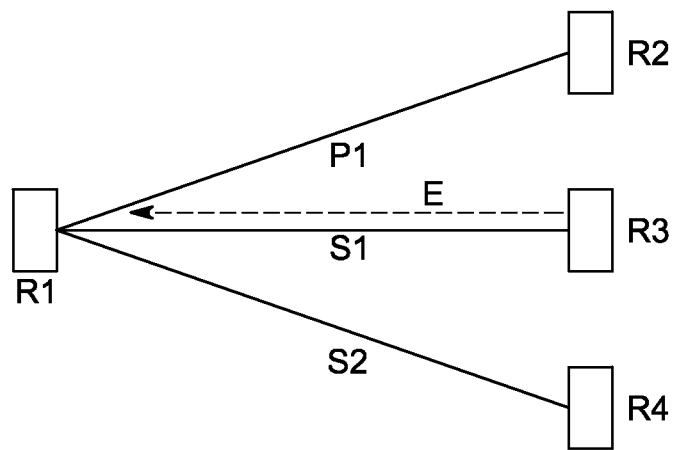
FIGS. 6A and 6B show a flow diagram for relaying emergency signals across different channels in accordance with the various embodiments of the present disclosure.
Figure 6B:
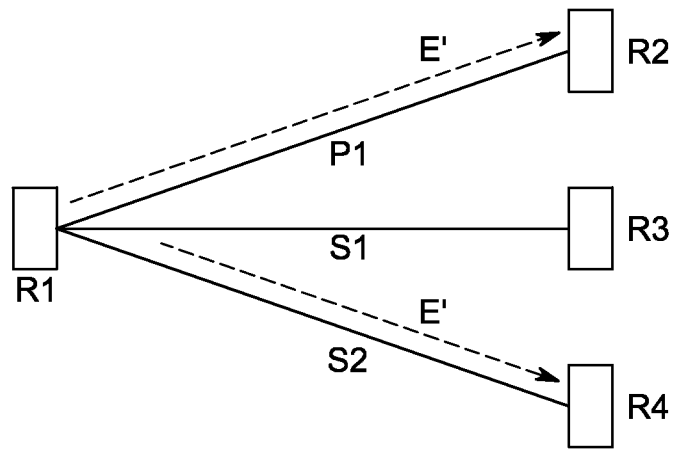

Similarly, FIGS. 6A and 6B show another flow diagram for relaying signals across different channels in accordance with various embodiments. In FIG. 6A, the second receiver of the radio communication device R1 detects an emergency signal E over the secondary channel S1 during the scanning of the secondary channels S1 and S2. The radio communication device R1, upon detecting the emergency signal E over the secondary channel S1, relays the emergency signal E' over non-detected primary channel P1 and non-detected secondary channel S2 as shown in FIG. 6B. In accordance with various embodiments, the relayed emergency signal E' is a relayed version of the received emergency signal E. By relaying the emergency signal E' on the primary channel P1 and the secondary channel S2, the radio communication device R1 relays the emergency signal E' to other radio communication devices R3 and R4 operating on the primary channel and the secondary channel S2 respectively.

The present disclosure utilizes dual-watch capability of the radio communication devices to facilitate the efficient propagation of an emergency signal from one to multiple radio communication devices, without sacrificing the basic talk-listen functionality of the radio communication devices. This allows the propagation of an emergency signal from one to multiple channels in talk-around or direct radio operation without the need for a base repeater. The method is also beneficial when deployed in base repeater systems (e.g., with conventional repeaters or trunked base stations), as a complement in system performance and quality of service (QoS) in "out-of-range" type of scenarios. Moreover, the system offers the ability to use various voice recognition based alternatives (to a regular emergency call), for detecting and establishing an emergency situation based on the audio stream analysis of a voice call received by either the dual-watch primary or secondary receivers in a two-way radio communication device.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for operating a radio communication device comprising dual-receivers, the method comprising:
    operating a main transmitter and a first receiver of the radio communication device to communicate over a primary channel;
    operating a second receiver of the radio communication device to scan a pre-stored list of a plurality of secondary radio-to-radio channels;
    monitoring the primary channel and the plurality of secondary radio-to-radio channel and detecting whether there is an emergency signal being received on either the primary channel or one of the plurality of secondary radio-to-radio channels; and
    responsive to detecting that there is the emergency signal being received on either the primary channel or one of the plurality of secondary radio-to-radio channels, relaying, using the main transmitter, the emergency signal to the primary channel and all of the plurality of secondary radio-to-radio channels other than the primary channel or the one of the plurality of the secondary radio-to-radio channel over which the emergency signal is being received.

2. The method of claim 1, wherein relaying further comprises:
    relaying, along with the emergency signal, an identifier or location information of the radio communication device from which the emergency signal originated.

3. The method of claim 1, wherein the detecting further comprises:
    monitoring for a voice call received on either the primary channel or one of the plurality of secondary radio-to-radio channels; and determining that the voice call contains the emergency signal based on one or more emergency related pre-selected keywords, phrases or voice distress received on the voice call.

4. The method of claim 1, wherein the detecting further comprises:
monitoring for a data call received on either the primary channel or one of the plurality of secondary radio-to-radio channels; and
determining that the data call contains an emergency signal based on signaling data received on the data call.

5. The method of claim 1, further comprising:
determining whether there is a signal reception on the primary channel.

6. The method of claim 5, further comprising:
determining whether a pre-emption of the signal reception is allowed; and
pre-empting signal reception on the primary channel for relaying the emergency signal when pre-emption of the signal reception is allowed.

7. The method of claim 5, wherein the relaying occurs when there is no signal reception on the primary channel.

8. The method of claim 6, further comprising:
completing the signal reception on the primary channel prior to relaying an emergency signal when pre-emption of the signal reception on the primary channel is not allowed.

9. The method of claim 8, wherein pre-emption of the signal reception on the primary channel is determined based on whether the signal reception includes an emergency signal.

10. The method of claim 1, further comprising:
prior to relaying the detected emergency signal, determining whether the detected emergency signal is already relayed; and
refraining from relaying the emergency signal when the emergency signal is already relayed.

11. A radio communication device for relaying emergency signals, comprising:
a main transmitter transmitting over a primary channel and a pre-stored scan list of a plurality of secondary radio-to-radio channels;
a first receiver receiving over the primary channel;
a second receiver scanning the plurality of secondary radio-to-radio channels; and
a processor coupled to the main transmitter, the first receiver and the second receiver, the processor configured to monitor, via the first and second receivers, the primary channel and the plurality of secondary radio-to-radio channels and detect whether there is an emergency signal being received on either the primary channel or one of the plurality of secondary radio-to-radio channels, and responsive to detecting that there is the emergency signal being received on either the primary channel or one of the plurality of secondary radio-to-radio channels, to cause the main transmitter to relay the emergency signal to the primary channel and all of the plurality of secondary radio-to-radio channels other than the primary channel or the secondary radio-to-radio channel over which the emergency signal is being received.

12. The radio communication device of claim 11, wherein a voice call is received on either the primary channel or one of the plurality of secondary radio-to-radio channels and further wherein the voice call contains an emergency signal comprising one or more emergency related pre-selected keywords, phrases, or voice distress.

13. The radio communication device of claim 11, wherein a data call is received on either the primary channel or one of the plurality of secondary radio-to-radio channels and further wherein the data call contains signaling data indicating an emergency signal.

14. The radio communication device of claim 11, wherein the processor determines whether there is a signal reception on the primary channel.

15. The radio communication device of claim 11, wherein the processor determines whether a pre-emption of the signal reception is allowed, and further preempts signal reception on the primary channel for relaying the emergency signal when pre-emption of the signal reception is allowed.

16. The radio communication device of claim 11, wherein the main radio transmitter relays a detected emergency signal when there is no signal reception on the primary channel.

17. The radio communication device of claim 11, wherein the first receiver completes the signal reception on the primary channel prior to the radio communication device relaying an emergency signal when pre-emption of the signal reception on the primary channel is not allowed.

18. The radio communication device of claim 11, wherein pre-emption of the signal reception on the primary channel is determined based on whether the signal reception includes an emergency signal.

19. The radio communication device of claim 11, wherein the processor determines whether the detected emergency signal is already relayed, and further wherein the main transmitter refrains from relaying the emergency signal when the emergency signal is already relayed.

20. A radio communication system including a plurality of radio communication devices, each radio communication device comprising:
a dual-watch receiver comprising a primary receiver receiving over a user selected home channel and a secondary receiver scanning a plurality of secondary radio-to-radio channels, wherein the dual-watch receiver, monitors, via the primary and secondary receivers, the user selected home channel and the plurality of secondary radio-to-radio channels for receipt of an emergency signal, and responsive to detection of the emergency signal in either the user selected home channel or the one or more secondary radio-to-radio channels, relays the emergency signal over the primary channels and all of the plurality of secondary channels other than the primary channel or the one or more secondary radio-to-radio channel over which the emergency signal is received.

* * * * *